(12) United States Patent
Mayrargue (10) Patent No.: US 7,623,592 B2
(45) Date of Patent: Nov. 24, 2009

(54) REDUCED SPACE TIME TRANSMIT DIVERSITY (STTD) INTERFERENCE TRANSMISSION METHOD

(75) Inventor: Sylvie Mayrargue, Paris (FR)

(73) Assignee: France Telecom, Paris (FR)

( * ) Notice: Subject to any disclaimer, the term of this patent is extended or adjusted under 35 U.S.C. 154(b) by 1217 days.

(21) Appl. No.: 10/481,764

(22) PCT Filed: Jun. 21, 2002

(86) PCT No.: PCT/FR02/02165

§ 371 (c)(1),
(2), (4) Date: Jun. 21, 2004

(87) PCT Pub. No.: WO03/001729

PCT Pub. Date: Jan. 3, 2003

(65) Prior Publication Data

US 2004/0234005 A1 Nov. 25, 2004

(30) Foreign Application Priority Data

Jun. 21, 2001 (FR) .................................. 01 08178

(51) Int. Cl.
*H04L 27/00* (2006.01)
(52) U.S. Cl. ........................ 375/299; 375/347; 455/101
(58) Field of Classification Search ................ 375/299, 375/347; 455/101
See application file for complete search history.

(56) References Cited

U.S. PATENT DOCUMENTS

| | | | |
|---|---|---|---|
| 6,185,258 B1 * | 2/2001 | Alamouti et al. | 375/260 |
| 6,452,916 B1 * | 9/2002 | Hochwald et al. | 370/342 |
| 6,470,192 B1 * | 10/2002 | Karlsson et al. | 455/561 |
| 6,834,043 B1 * | 12/2004 | Vook et al. | 370/310 |
| 6,865,237 B1 * | 3/2005 | Boariu et al. | 375/295 |
| 7,010,029 B1 * | 3/2006 | Naguib et al. | 375/229 |
| 7,236,538 B1 * | 6/2007 | Banister | 375/267 |
| 2002/0172293 A1 * | 11/2002 | Kuchi et al. | 375/267 |

OTHER PUBLICATIONS

Balaban, "Dual diversity Combining and Equalization in Digital Cellular Mobile Radio" IEEE Trans on Vehicular Technology vol. 40 May 1991.*

3GPP 3G TS 25.211 V4.0.0 Mar. 2001.*

"A Space-Time Coding Approach for Systems Employing Four Transmit Antennas", C. Papadias, et al., 2001 IEEE, pp. 2481-2484. vol. 4 XP002195791.

"A Transmitter Diversity Scheme for Wideband CDMA Systems Based on Space-Time Spreading", IEEE Journal on Selected Areas in Communications, IEEE, New York, vol. 19, No. 1, Jan. 2001, pp. 48-60.

(Continued)

*Primary Examiner*—Juan A Torres
(74) *Attorney, Agent, or Firm*—Cohen Pontani Lieberman & Pavane LLP (57) ABSTRACT

Disclosed is a transmission method wherein n antennae emit each symbol with a spread spectrum code, where the codes are the same for n antennae at each transmission considered from k transmissions, k is an even number and the symbols are coded according to k successive codes corresponding to k transmissions. The k codes provide k/2 pairs of codes which verify, in each pair, the relationship in which a pair code is time-inverted and combined in relation to the other code of the pair, and is optionally multiplied by a module 1 complex constant.

10 Claims, 4 Drawing Sheets

OTHER PUBLICATIONS

"A Simple Transmit Diversity Technique for Wireless Communications", S. Alamouti, IEEE Journal, vol. 16, No. 8, Oct. 1998, 8 pages.

3GPP 3G TS 25.211 V3.2.0 (Draft 1) Mar. 2000.
3GPP 3G TS 25.213 V3.2.0 (Draft 1) Mar. 2000.

* cited by examiner

FIG. 1

--PRIOR ART--

FIG.2

--PRIOR ART--

REDUCED SPACE TIME TRANSMIT DIVERSITY (STTD) INTERFERENCE TRANSMISSION METHOD

The present patent application is a non-provisional application of International Application No. PCT/FR02/02165, filed Jun. 21, 2002.

BACKGROUND AND SUMMARY OF THE INVENTION

The technical field to which this invention relates is that of digital communications, in particular wireless communications. The systems to which the invention mostly relates are multicarrier systems and spread spectrum systems or any system formed from the combination of these two systems, including MC-CDMA.

Wireless communications are used for example in cellular networks, in a local radio loop and in RF broadcasting.

The exponential growth in wireless communications makes it crucial to optimize the use of the RF spectrum, a rare and expensive resource.

The invention proposes to contribute to this optimization in two ways:

by improving the transmitter/receiver link budgets, thereby making it possible to extend the radio coverage for given transmission power. However, the power transmitted is generally limited by the technology (linearity, etc) and the cost of the amplifiers, also by the energy consumption (battery, etc)

by increasing the capacity of cellular radio systems, itself dependent on the quality of the links.

Transmit antenna diversity is a means of carrying out this optimization by exploiting the properties of the propagation channel linking the transmitter to the receiver.

In the field of mobile telephony, the propagation channel between the base and the mobile exhibits a random character, caused by the recombining of the multipaths created by reflections off buildings and various obstacles present in the environment.

Frequency selective fadeouts thus occur and may impair the quality of the communications. Two antennas are said to be in diversity when the channels linking them to the same mobile are statistically uncorrelated.

Diversity can be obtained either by placing the antennas a sufficient distance apart, or by using differently polarized antennas, or by diverse polarization accesses of the same physical antenna, or by any other means.

Receive antenna diversity has been known for a very long time as a means of combating these fadeouts. Specifically, if the waves picked up are statistically uncorrelated, this will make it possible through diverse processing means: selection, combination, etc . . . to obtain less frequent and/or less severe decays. One therefore obtains a first gain afforded by the presence of several receivers (the power received is multiplied accordingly), and a second due to the above processing. This second gain may be substantial [1], and is correspondingly bigger for very low error rates.

Transmit diversity at the base station is more expensive than receive diversity, since it requires two transmitters, for example one at each of the antennas. The benefits stem from the same origin: transmitting the signal via two statistically uncorrelated paths. However, the first of the two gains cited above for receive diversity disappears: there is now just one receiver. Only the second gain remains.

Transmit diversity is the main application of the invention.

In the case of a single channel consisting of several paths, it is known how to best isolate the repetitions of one and the same signal received by way of the various paths, although these offset repetitions arrive in a superposed manner at the receiver.

For this, a method called rake reception is known, when each sample is processed by spectrum spreading.

Spectrum spreading was initially used to combat interference and/or to multiplex several communications. Spectrum spreading actually makes it possible to combat extra-cellular scrambling, and allows the multiplexing of the various users: the latter share the same frequency band and are differentiated by their spreading sequence, the code, as explained hereinbelow.

The spreading is therefore carried out by multiplying each symbol transmitted by a string of chips, forming a code of length equal to the spreading factor. The code is not necessarily the same for each symbol. The frequency band required to transmit such a signal is increased by a factor F, hence the name "spread spectrum".

The spreading therefore consists in going from the symbol rate to the chip rate, which is faster, the ratio of the two being dubbed the spreading factor (F), and generally being equal to $2^k$. The duration of a symbol being T, that of a chip being $T_{chip}$, we have $T/T_{chip}=F$.

Finally, each chip is shaped by a pulse $P_{chip}(t)$ in general a Nyquist root filter.

$$p_0 = \int |p_n(t)|^2 dt = F^* \int (p_{chip}(t))^2 dt$$

The transmission channel is customarily regarded as a sum of Diracs, that is to say as one and the same signal repeated and superposed on itself several times, with several variable offsets that are in practice much shorter than the duration of a spread symbol.

Through rake reception it is known how to satisfactorily isolate these various superposed repetitions of the signal at the level of the mobile, by virtue of a method for identifying the repetition of peaks in the superposed signal, and for determining the start of each superposed signal.

More precisely, the signals transmitted consisting of a string of symbols each coded as a series of very fast chips, a filter matched to the coding is applied each time that the start of a sequence corresponding to the coding of a symbol is detected.

This matched filter is therefore applied several times to similar signals corresponding to various paths, offset with respect to one another. With each application of the matched filter, the offset sequences will give rise to only fairly weak noise.

Figure 1:
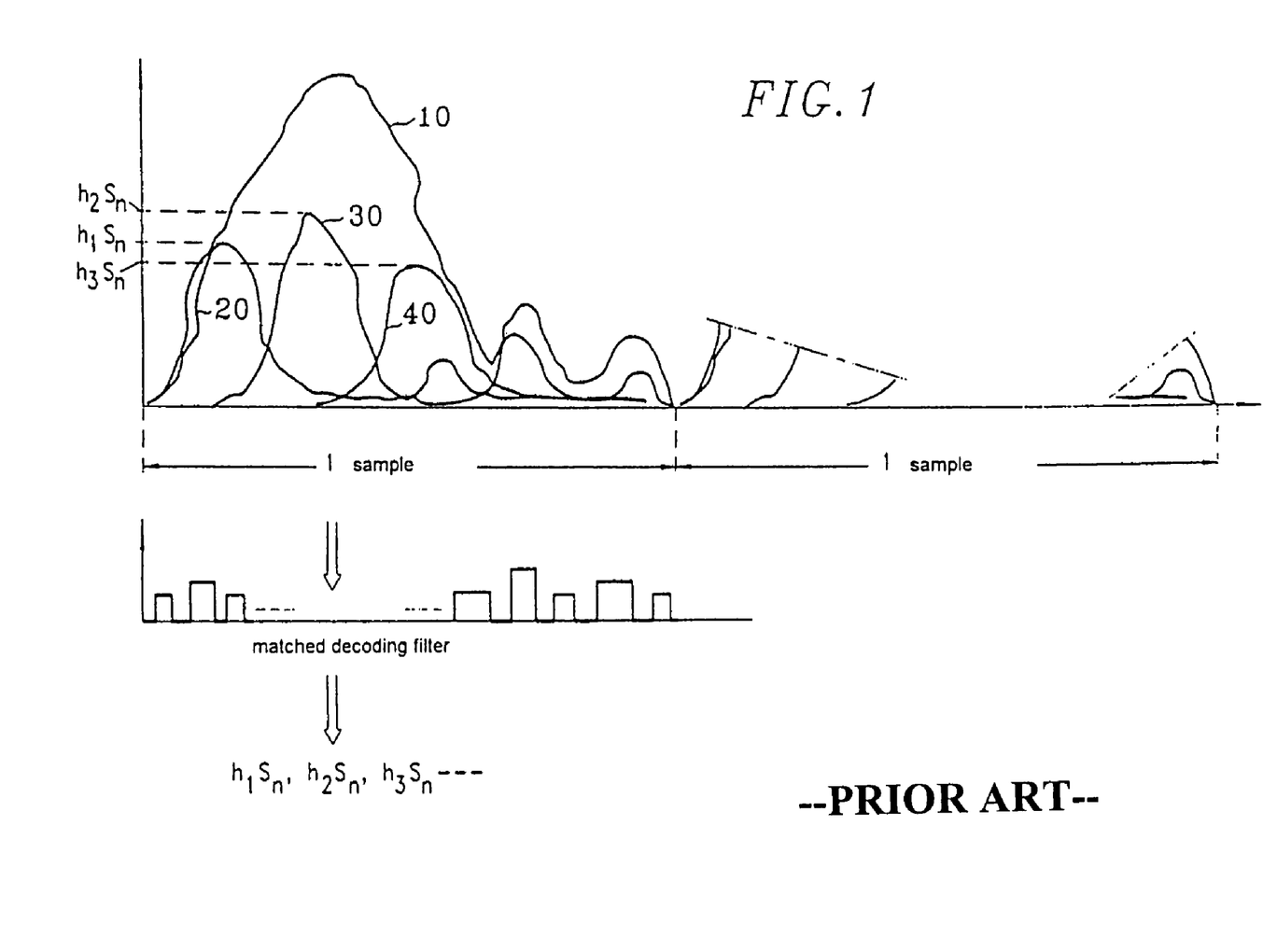
FIG. 1 is a diagram illustrative of the rake reception technique.

Thus, as represented in FIG. 1, the so-called RAKE technique or rake receiver uses the coding to isolate, in a superposed signal 10, signals 20, 30, 40 each corresponding to one and the same coding of one and the same symbol, for several paths transmitting a symbol $S_n$.

One and the same signal corresponding to the coding of one and the same symbol $S_n$ is thus isolated several times so as to obtain several evaluations $h_1 S_n, h_2 S_n, h_3 S_n \ldots$ of the value of the symbol $S_n$, each time affected by a transmission factor $h_1, h_2, h_3 \ldots$ corresponding to the effect of the particular path.

A channel-matched filter is applied to the values $h_1 S_n, h_2 S_n, h_3 S_n \ldots$ obtained, the function of this filter being to deliver a series of evaluations of sn, the effect of whose p paths $h_1, h_2, h_3, \ldots$ has been favorably combined. The latter matched filter is estimated by the mobile according to a technique that will not be detailed here.

For each delay associated with one of the paths selected a correlation is performed through the conjugate of the code modulating the symbol, the result of the correlation is multiplied by the conjugate of the estimate of the amplitude of the path, and the various results are summed.

Thus, the rake receiver is a matched filtering, simplified in that: the approximation is made that the channel is formed of a finite number of paths delayed with respect to one another (the impulse response of the channel is therefore formed of a string of Dirac pulses). The matched filtering is done only by taking account of these paths.

A method dubbed Space Time Transmission Diversity (STTD) for best exploiting the information carried by the samples transmitted by way of several antennas and arriving at one and the same mobile in a superposed manner is thus also known.

The concept of STTD has been presented [3] as applying to a transmission of modulated symbols in a channel with frequency-unselective impulse response, (i.e., a complex multiplicative constant), the transmitter consisting of two sensors. The transmission chain is represented in baseband, that is to say after passing through the matched filters and sampling.

A typical example of implementing STTD may be summarized thus: the symbols are grouped in twos. While the first antenna is transmitting the symbols in the order in which they arrive (as it would do if the transmission had occurred on a single antenna), the second transmits the complex conjugates of the same symbols, but in a modified order, and moreover with a change of sign every other time: the second antenna transmits $-s_{n+1}^*$, $s_n^*$ (* signifies complex conjugate) while the first is transmitting sn, sn+1. Likewise for the subsequent symbols, $s_{n+2}$, $s_{n+3}$ etc.

It may be shown that, if the estimation of the channels is perfect on reception (the problems of channel estimation are outside our concern), the expression for the symbols before detection is similar to that which would be provided by a diversity receiver of the "Maximal ratio receiver combining" type [3], the signals being transmitted on a single antenna, and received on two antennas, the propagation channels linking the single transmitter to each receiver being the same ones respectively as those linking each of the transmission antennas to the single receiver of the STTD.

To summarize, the symbols to be transmitted are considered pairwise, they are transmitted while inverting the symbols of the pair on one antenna by inverting the signs of chosen symbols, and transmitting the conjugate of chosen symbols, so as to obtain a 2×2 transmission matrix which is orthogonal.

Thus, it is easy to solve a 2×2 linear equation which, because the mobile knows the transmission functions of the various paths, makes it possible to deduce therefrom independently the transmitted and superposed initial symbols $s_n$ and $s_{n+1}$ of the simultaneous transmission by two antennas. The maximum information transmitted by these two antennas is therefore derived by harnessing the transmission by two antennas in terms of transmission efficiency.

This method has already been generalized to a larger number of antennas, whether the orthogonal transmission matrix be square or otherwise.

The matrix may not be strictly orthogonal, but give by multiplication with its conjugate transpose a matrix which is substantially diagonal, that is to say which exhibits small and/or sparse values off the diagonal, this being acceptable in certain cases.

The symbols may be grouped in p-tuples, other than pairs. The number of antennas n may be different from the number p of symbols per group.

These p-tuples are transmitted by the transmissions, k possibly being different from p and from n, a substantially orthogonal matrix can be obtained which is not necessarily square.

The equations are typically the following in the case of two antennas and of transmission in pairs of symbols:

Let $\{s_n\}$ be the string of symbols to be transmitted. The first antenna will transmit $\{s_n\}$ in this order, while the second antenna is transmitting the same symbols in a modified order. The symbols are grouped in twos.

For example, the second antenna transmits $-s_{2n+1}^*$, $s_{2n}^*$ (* signifies complex conjugate) while the first is transmitting $s_{2n}$, $s_{2n+1}$. To streamline the notation, and since the parity of the first index of the two grouped symbols is of no importance, they will subsequently be denoted $s_n$ and $s_{n+1}$.

The baseband representation of the system is considered, and the channels involved are considered to group together the effects of the transmission/reception filters and also of the propagation. Let h1 (respectively h2) be the channel linking the first (respectively second) antenna to the mobile.

We have $$y_n = h_1 s_n - h_2 s_{n+1}^* + b_n \quad (1)$$

$$y_{n+1} = h_1 s_{n+1} + h_2 s_n^* + b_{n+1} \quad (2)$$

where $b_n$ denotes the noise of the receiver at time n.

The second equation is conjugated:

$$y_{n+1}^* = h_1^* s_{n+1}^* + h_2^* s_n + b_{n+1}$$

After passing through the filters matched to the various channels, we have:

$$y_n^1 = (|h_1|^2 s_n - h_2 h_1^* s_{n+1}^*) + h_1^* b_n \quad (3)$$

$$y_n^2 = (h_2 h_1^* s_{n+1}^* + |h_2|^2 s_n) + h_2 b_{n+1} \quad (4)$$

By adding (3) and (4) we obtain:

$$(3)+(4) = s_n(|h_1|^2 + |h_2|^2) + h_1^* b_n + h_2 b_{n+1} \quad (5)$$

By interchanging the roles of $h_1$ and of $h_2$ in (3) and after linearly combining the results, we likewise have:

$$s_{n+1}(|h_1|^2 + |h_2|^2) + h_1 b_{n+1}^* - h_2^* b_n \quad (6)$$

It is therefore seen that, to within a sign on one of the noise terms in (6)—this does not change the power of the noise—everything takes place as if the data to be transmitted, s, were transmitted in succession by a single antenna, were filtered by two channels h1 and h2, and were received by a receiver performing optimal combining of the data received at each symbol time.

The estimation of the channels, prior to the matched filtering, is assumed here to be perfect. The estimation of the channels will not be detailed here.

It has been proposed that the techniques of STTD and of rake reception recalled hereinabove be combined.

Thus, the $3^{rd}$ Generation Partnership Project (3GPP) [4] has adopted STTD in Universal Mobile Telecommunications System (UMTS) Frequency Division Multiplex (FDD).

It has been proposed that these two methods be associated in the case where a multitude of paths are superposed with a coding of the symbols and where transmission takes place via two diversity antennas.

On each channel, the ripples corresponding to the superpositions of simultaneously coded symbols are firstly separated so that each path corresponding to one and the same instant of transmission is separated (rake reception).

Then a decoding is applied to each ripple of chips (despreading) to obtain values of superposition of two symbols transmitted simultaneously by the two antennas. Stated otherwise, each superposition of symbols is despread. Then, these symbols being transmitted in pairs according to an orthogonal transmission matrix, the orthogonality of the matrix is exploited so as to de-superpose the initial samples.

Figure 2:
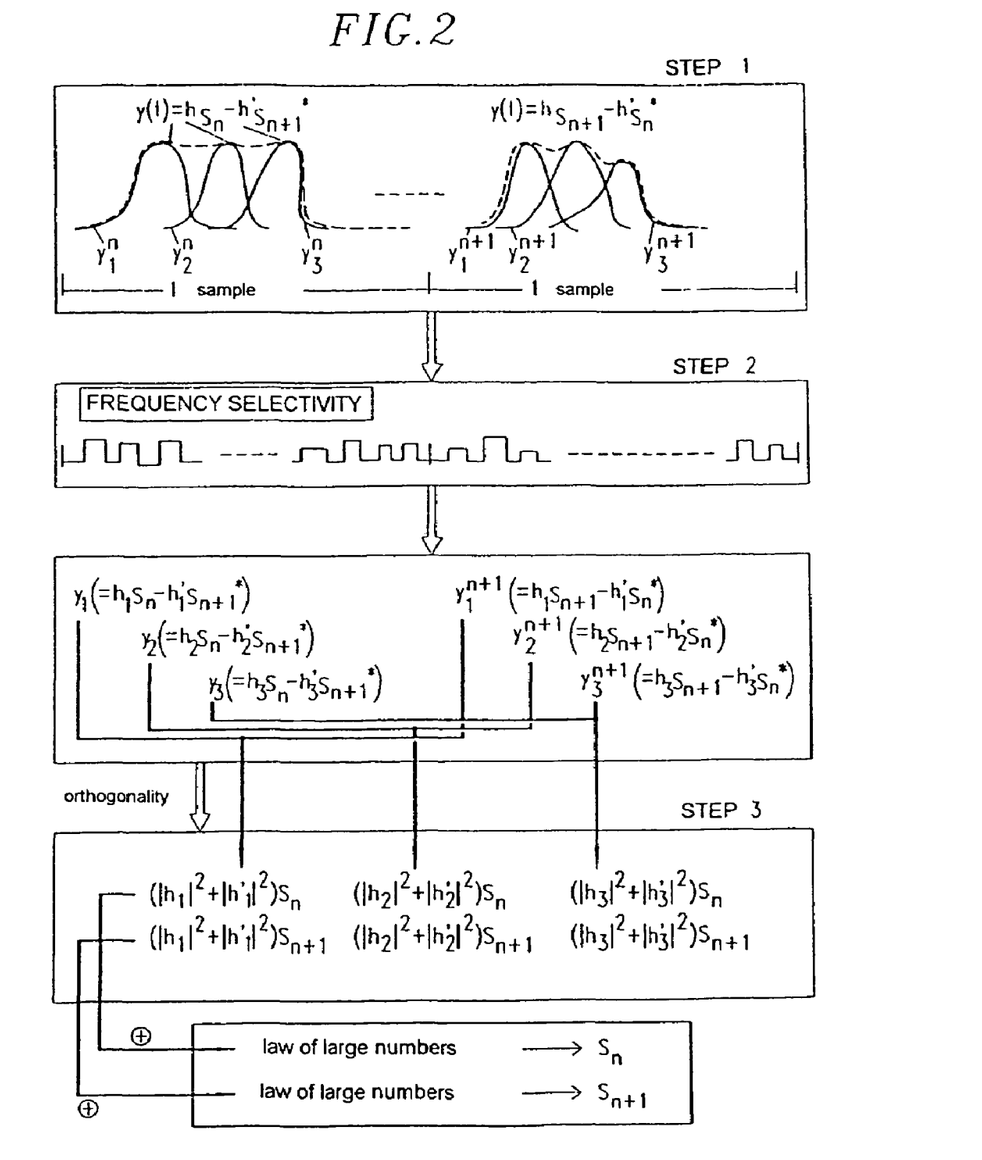
FIG. 2 is a chart representing the successive steps implemented in a combination of the techniques of rake reception and of separation of symbols by transmission matrix orthogonality.

Stated otherwise, the paths are separated by detecting peaks (step 1 in FIG. 2), then the signals carried by the peaks are decoded pathwise (despreading), doing so twice in succession (step 2 in FIG. 2), and the symbols of the pair are separated by exploiting the orthogonality of 2×2 transmission matrix corresponding to these two successive instants (step 3 in FIG. 2).

The information which is repeated through the presence of various paths is therefore firstly separated (rake reception) and the equations stemming from the orthogonality of the transmission matrix are applied so as to deduce therefrom the two (STTD) initial symbols of each pair.

The orthogonality of the transmission matrix is exploited several times, corresponding to the various isolated paths. It will be noted that in order to do this, the time offsets between paths are preferentially very small compared with the spreading of a symbol.

In this case, the demodulation of STTD type is done path by path, and the results of the calculations relating to each path are added together for each of the STTD symbols.

Stated otherwise, the STTD technique is generalized to frequency-selective channels, via a concept of rake receiver [1], preferably under the assumption that the length of the impulse response of the propagation channel is much shorter than the duration of a symbol.

The equations corresponding to such a combination of methods are presented hereinbelow by way of detail.

The effect of the propagation channel is distinguished therein from that of the filter shaping the symbols transmitted. The propagation channel is in both cases a complex multiplicative constant. This presentation does not feature in [3].

It is noted that the spreading of symbols by codes, which is characteristic of any American Mobile Radio Corporation (AMRC) type system, including UMTS FDD, is merely one particular type of modulation applied to symbols and in which the code applied to the symbol transmitted plays the role of the shaping filter. These equations therefore apply to this type of transmission, where a single code is transmitted at a time, however.

The propagation channel linking the first (respectively second) antenna to the mobile is denoted h1 (respectively h2). These are complex constants. Let $p_n(t)$ (respectively $p_{n+1}(t)$) be the shaping filter for the nth (respectively n+1st) symbol, transmitted over the interval $nT \leq t < (n+1)T$ (respectively $(n+1)T \leq t < (n+2)T$) where T denotes the duration of a symbol. It will be assumed that $p_n$ and $p_{n+1}$ have temporal support approximately limited to [0, T]. Let y(t) be the signal received at the mobile.

We have:

$$y(t)=(h_1 s_n - h_2 s_{n+1}^*)p_n(t-nT)+b(t) nT \leq t<(n+1)T \quad (1bis)$$

$$y(t)=(h_1 s_{n+1}+h_2 s_n^*)p_{n+1}(t-(n+1)T)+b(t)(n+1)T \leq t<(n+2)T \quad (2bis)$$

b(t) denotes the noise of the receiver at time t.

After passing through the filters matched to the various channels and sampling at the symbol rate, we have:

$$y_n^1 = \int_{(nT,(n+1)T)} y(t) h_1^* p_n(t-nT)^* dt = (|h_1|^2 s_n - h_2 h_1^* s_{n+1}^*)p_0 + b_n^1 \quad (3bis)$$

$$y_n^2 = \int_{((n+1)T,(n+2)T)} y(t) h_2^* p_{n+1}(t-(n+1)T)^* dt = (h_2^* h_1 s_{n+1} + |h_2|^2 s_n^*) p_0 + b_{n+1}^2 \quad$$

where $p_0 = \int |p_n(t)|^2 dt = \int |p_{n+1}(t)|^2 dt$

We conjugate the second equation:

$$y_n^{2*}=(h_2 h_1^* s_{n+1}^* + |h_2|^2 s_n) p_0 + b_{n+1}^{2*} \quad (4bis)$$

By adding (3) and (4) we obtain:

$$(3)+(4)=s_n(|h_1|^2+|h_2|^2)p_0+b_n^1+b_{n+1}^{2*} \quad (5bis)$$

By interchanging the roles of $h_1$ and of $h_2$ in (3) and after linearly combining the results, we likewise obtain:

$$s_{n+1}(|h_1|^2+|h_2|^2)p_0+bruit \quad (6bis)$$

The estimation of the channels, prior to the matched filtering, is assumed to be perfect since the problems of imperfect estimation are off the subject.

It is seen that the above calculation encompasses the case where $p_n(t)$ designates a spreading code shaped by the chip pulse in an AMRC system.

However, it is apparent that when rake reception is combined with the STTD technique, nuisance interference appears.

(It is already known that in a system with orthogonal codes the channel selectivity causes a break in the orthogonality of the codes).

The selectivity gives rise in particular to interference between the simultaneously transmitted symbols.

If two symbols, in particular consecutive ones, are in STTD, it is shown hereinbelow that additional interference occurs, caused by the second STTD symbol as well as by all those multiplexed by the codes transmitted during this second symbol time.

The aim of the invention is therefore mainly to reduce this intersymbol interference. By canceling the interference caused by the terms transmitted in the symbol duration of the second STTD symbol, interference which appears when the channel is frequency selective.

The result is a reduction of around ⅔ in the level of intersymbol interference, for equal complexity of the receiver.

The invention applies to STTD whether the spectrum spreading be carried out by means of mutually orthogonal codes or otherwise, and is not limited, in its main object, to 2×2 cases.

With this aim, the invention proposes a transmission method in which:

n antennas, n greater than or equal to 2, are used to transmit symbols grouped into p-tuples $(S_1, \ldots, S_p)$, while carrying out, for each p-tuple, k times a simultaneous sending of n symbols, the n symbols consisting each time of values from among $S_1, \ldots, S_p$ which are in a modified order and are assigned weights chosen selectively from among −1, 0 and 1, and are selectively conjugated, so that k linear superpositions of n symbols are transmitted in such a way as to constitute a transmission matrix of dimensions k×p which is substantially orthogonal;

the n antennas furthermore send each symbol with a spread spectrum coding, the codings being the same on the n antennas at each transmission concerned among the k transmissions;

the transmission being performed over a physical or contrived channel which constitutes substantially a sum of Diracs, so that each superposition of symbols is repeated several times on reception; in which method furthermore:

each superposition of n symbols is extracted with the aid of despreadings on reception several times;

these several extractions are done with the aid of despreadings for each of the k superpositions transmitted so that several estimations of k-tuples are obtained, each k-tuple forming a result of the k×p transmission matrix;

the orthogonality of the k×p matrix is exploited several times corresponding to each of the several k-tuple extractions, so that an estimation of the p-tuple $(S_1, \ldots, S_p)$ and therefore of each symbol $S_1, \ldots S_p$ is obtained several times;

and an estimation of each symbol $S_1, \ldots, S_p$ is deduced, sharpened on the basis of the symbols estimated several times, characterized in that k is an even number, and that the symbols are coded according to k successive codes corresponding to the k transmissions, the k codes consisting of k/2 pairs of codes which satisfy, in each pair, the property according to which a code of the pair is time-inverted and conjugated with respect to the other code of the pair, and possibly multiplied by a complex constant of modulus 1.

BRIEF DESCRIPTION OF THE DRAWINGS

Other characteristics, aims and advantages of the invention will become apparent on reading the detailed description which follows, given with reference to the appended figures in which.

DETAILED DESCRIPTION OF THE EXEMPLARY EMBODIMENTS

The mobile is in this example informed that the base station is employing it, in such a way as to perform the correlations of the rake receiver by the appropriate codes. This excepted, in this example the receiver is identical to that of the current STTD.

The inventors were able to identify that the interference between symbols arising when combining the STTD and rake reception techniques is of the type which will be set forth hereinbelow.

The impulse response of the channel linking the first (respectively the second) antenna to the mobile will be denoted $h_1(t)$ (respectively $h_2(t)$).

It will be assumed that, preferentially, the offsets between paths are small, compared with the duration of spreading of the symbols.

It will also be assumed that the temporal spreading of the channel is, preferentially, small compared with the length of a symbol. The latter condition makes it possible to neglect the intersymbol interference and to apply the rake receiver as described in [2].

The rake receiver being merely a simplified version of the filter matched to the propagation channel convolved with the spreading code of the symbol to be detected, we shall present its extension to the diversity reception of STTD transmission by writing it as a matched filter since the presentation is simpler.

Let us firstly consider the case of a single user:

Let y(t) be the signal received at the mobile. We have:

$$y(t)=((h_1 s_n - h_2 s_{n+1}^*)^* p_n)(t-nT)+b(t) \quad nT \leq t < (n+1)T \quad (12)$$

$$y(t)=((h_1 s_{n+1} + h_2 s_n^*)^* p_{n+1})(t-(n+1)T)+b(t) \quad (n+1)T \leq t < (n+2)T \quad (13)$$

* designates convolution and b(t) the noise of the receiver at time t. For greater clarity, it will be assumed that b(t)=0, since noise processing is not our concern.

It is more practical to express the above relations in the frequency domain.

Let $H_1(f)$ (respectively $H_2(f)$) be the transfer function of the propagation channel, f denoting frequency. The Fourier transforms of equations (12) and (13) will be calculated respectively over the intervals [nT, (n+1)T] and [(n+1)T, (n+2)T]. It is therefore seen that the Fourier transforms of the coding $p_n$ (respectively $p_{n+1}$) over the interval [0,T] are involved. They will be denoted $C_n(f)$ (respectively $C_{n+1}(f)$).

By assumption, they have an approximately finite support denoted B. The result of the Fourier transform of y(t) over the two intervals mentioned will depend on n via an index.

We therefore have:

$$Y_n(f)=(H_1(f)s_n - s_{n+1}^* H_2(f))C_n(f)$$

$$Y_{n+1}(f)=(H_1(f)s_{n+1} + s_n^* H_2(f))C_{n+1}(f)$$

In order to make the same variables appear in both equations, we conjugate the second:

$$Y_{n+1}(f)^*=(H_1(f)^* s_{n+1}^* + s_n H_2(f)^*)C_{n+1}(f)^*$$

We therefore obtain a system of two equations in two unknowns, that may be written in matrix form:

$$\begin{bmatrix} Y_n(f) \\ Y_{n+1}^*(f) \end{bmatrix} = \begin{bmatrix} H_1(f)C_n(f) & -H_2(f)C_n(f) \\ H_2^*(f)C_{n+1}^*(f) & H_1^*(f)C_{n+1}^*(f) \end{bmatrix} \begin{bmatrix} s_n \\ s_{n+1}^* \end{bmatrix} \quad (14)$$

To demodulate $s_n$ and $s_{n+1}^*$, we perform a matched filtering followed by a sampling at the instant 0.

The estimation of the various channels is assumed to be perfect on reception, since the problems of channel estimation are not our concern.

In the frequency domain, the matched filtering gives a matrix multiplication:

$$\begin{bmatrix} H_1^*(f)C_n^*(f) & H_2(f)C_{n+1}(f) \\ -H_2^*(f)C_n^*(f) & H_1(f)C_{n+1}(f) \end{bmatrix}$$

$$\begin{bmatrix} Y_n(f) \\ Y_{n+1}^*(f) \end{bmatrix} = \begin{bmatrix} H_1^*(f)C_n^*(f) & H_2(f)C_{n+1}(f) \\ -H_2^*(f)C_n^*(f) & H_1(f)C_{n+1}(f) \end{bmatrix}$$

$$\begin{bmatrix} H_1(f)C_n(f) & -H_2(f)C_n(f) \\ H_2^*(f)C_{n+1}^*(f) & H_1^*(f)C_{n+1}^*(f) \end{bmatrix} \begin{bmatrix} s_n \\ s_{n+1}^* \end{bmatrix}$$

The sampling at the instant 0 is manifested in the frequency domain as an integral of each term of the matrix product over the frequency band B:

The first row of the matrix product on the right-hand side thus gives:

$$s_n \int_B (|H_1(f)C_n(f)|^2 + |H_2(f)C_{n+1}(f)|^2) df + s_{n+1}^* \int_B H_1(f) \cdot H_2(f)(|C_{n+1}(f)|^2 - |C_n(f)|^2) df \quad (15)$$

The second row:

$$s_{n+1}^* \int_B (|H_1(f)C_{n+1}(f)|^2 + |H_2(f)C_n(f)|^2) df + s_n \int_B H_1(f) H_2^*(f)(|C_{n+1}(f)|^2 - |C_n(f)|^2) df \quad (16)$$

The term $I = \int_B H_1(f)^* H_2(f)(|C_{n+1}(f)|^2 - |C_n(f)|^2) df$ therefore generates nuisance interference. If this term is zero, then the STTD device behaves as formed of a transmitter with ONE sensor, transmitting $s_n$ and $s_{n+1}^*$ IN SUCCESSION, and of a receiver with TWO sensors, and optimal reception [5].

The term I is zero among other things:

if $C_{n+1}(f) = C_n(f)$ or else $p_{n+1}(t) = p_n(t)$, this being the case if all the symbols are modulated by the same shaping filter (transmission of QPSK symbols modulated by a Nyquist filter for example), or if $C_{n+1}(f) = C_n^*(f)$ More generally, if $C_{n+1}(f) = C_n^*(f) e^{i\phi}$ where $\phi$ is a constant.

By way of reminder, if the channels are frequency-unselective: $H_1(f) = H_1$ and $H_2(f) = H_2$. In this case:

$$I = H_1^* H_2 \int_B (|C_{n+1}(f)|^2 - |C_n(f)|^2) df$$

Each term under the integral represents the energy of the shaping filters at the instants n and n+1. If these energies are equal, then I=0. This occurs for example in CDMA if each code has the same energy, this being the case in general.

However, in the general case of frequency-selective channels $I \neq 0$.

Let us now consider the case of several simultaneous users:

Let us take the example with 2 users with the same spreading factor of the above paragraph.

$$y(t) = ((h_1 s_n - h_2 s_{n+1}^*) p_{n,user1})(t-nT) + ((h_1 d_n - h_2 d_{n+1}^*) \cdot p_{n,user2})(t-nT) \quad nT \leq t < (n+1)T$$

$$y(t) = ((h_1 s_{n+1} + h_2 s_n^*) p_{n+1,user1})(t-(n+1)T) + ((h_1 d_{n+1} + h_2 d_n^*)) p_{n+1,user2})(t-(n+1)T) \quad (n+1)T \leq t < (n+2)T$$

this giving by Fourier transformation:

$$Y_n(f) = (H_1(f) s_n - s_{n+1}^* H_2(f)) C_{n,user1}(f) + (H_1(f) d_n - d_{n+1}^* H_2(f)) C_{n,user2}(f)$$

$$Y_{n+1}(f) = (H_1(f) s_{n+1} + s_n^* H_2(f)) C_{n+1,user1}(f) + (H_1(f) d_{n+1} + d_n^* H_2(f)) \times C_{n+1,user2}(f)$$

Added to (14) are the extra terms originating from the second user, so that (15) becomes (15bis):

$$s_n \int_B (|H_1(f) C_{n,user1}(f)|^2 + |H_2(f) C_{n+1,user1}(f)|^2) df +$$

$$d_n \int_B (|H_1(f)|^2 C_{n,user2}(f) C_{n,user1}(f)^* + |H_2(f)|^2 C_{n+1,user2}(f) C_{n+1,user1}(f)) df +$$

$$s_{n+1}^* \int_B H_1(f)^* H_2(f)(|C_{n+1,user1}(f)|^2 - |C_{n,user1}(f)|^2) df$$

$$-d_{n+1}^* \int_B H_1(f)^* H_2(f)(C_{n,user2}(f) C_{n,user1}(f)^* - C_{n+1,user2}(f)^* C_{n+1,user1}(f)) df$$

In the case where the mutually multiplexed codes are orthogonal, the first factor $d_n$ term is due to the classical breaking of this orthogonality through the selectivity of the channel. The second factor $d_{n+1}^*$ term like the factor $s_{n+1}^*$ term is non-zero (apart from particular cases such as the end of D.1) and hence estimates of the second symbol time will cause noise in the estimation of $s_n$. The same extra terms appear in (16) in the $s_n$ and $d_n$ factor and cause noise in the estimation of $s_{n+1}^*$.

Thus, just as in (15bis), two terms originating from the second symbol appear that will disturb the estimation of $s_n$. Now, a means of making them disappear exists. If we have:

$$C_{n+1,userj}(f) = C_{n,userj}(f)^* \exp(j\text{phi})$$

For any index n designating the first of the two STTD symbols, and for any index j representing a user, and phi is a constant independent of n and of j, we see that the two disturbing terms disappear (those in the $s_{n+1}^*$ and $d_{n+1}^*$ factor).

We therefore have:

$$15\text{bis} = s_n \int_B (|H_1(f)|^2 + |H_2(f)|^2) |C_{n,user1}(f)|^2 df +$$

$$d_n \int_B (|H_1(f)|^2 + |H_2(f)|^2) C_{n,user2}(f) C_{n,user1}(f)^* df$$

Now, $C_{n+1,userj}(f) = C_{n,userj}(f)^* \exp(j \text{ phi})$ is realized in the time domain if:

$$p_{n+1,userj}(t) = p_{n,userj}(T-t)^*.$$

This signifies that a spreading is implemented by codes which, for two different instants corresponding to two transmissions coupled by STTD, are mutually conjugated and inverted with respect to time.

When phi is different from zero, exp (jphi) is a complex constant with modulus 1 which gets applied to one of the two codes of the two STTD-grouped symbols, typically to the inverted and conjugated code.

The principle therefore consists for example in reversing the direction of time (and in conjugating) codes of length 256 at the rate of one out of two, by reversing the codes at the level of outputs of pairs of symbols associated with STTD.

Thus, in order for the additional interference terms caused by STTD to be made to disappear, the second STTD symbol must have a code obtained from the code of the first symbol by inverting the direction of time, and by conjugating it.

In the case of UMTS, this implies that the standard is modified in such a way that the Orthogonal Variable Spreading Factor (OVSF) codes are different for the 2 STUD symbols: by adding an index n to mark this dependence, we have: $C_{userj,n,k} = C_{userj,n+1,F-k+1}^*$ with F=spreading factor, n designating the first of the two STUD symbols.

It is clear that it matters little whether it is the first or the second STTD symbol whose direction of time is inverted with respect to the usual order.

This advantage is also found in the case where the STTD technique is applied with a k×n, different from 2×2, transmission matrix. Specifically, if we have p symbols transmitted by n antennas together with the conjugates, inversion of time and of signs necessary for the k×p matrix to be orthogonal, the elimination of the above-presented interference is achieved by coding the symbols with one or more pairs of codes, in which pairs two codes are time-inverted and conjugated.

Generally, a p-tuple is transmitted over k transmission instants, with n antennas. k is chosen to be even, and, for k/2 transmissions, one or more given codes are used, and for the other k/2 transmissions the conjugates and temporal inverses of these codes are used.

In the case where several symbols of different lengths are considered transmitted simultaneously and hence codes applied simultaneously.

Let us recall that the signal transmitted by user 1 to modulate the n-th symbol was denoted by:

$$p_{n,user1}(t)$$

$$0 \leq t < T$$

Let us thus assume that user 2 has a different spreading factor from that of 1. Without loss of generality, it will be assumed that user 2 has a spreading factor half that of 1, hence double the symbol bit rate. While user 1 is transmitting $s_n$, then $s_{n+1}$, user 2 transmits 4 symbols, that will be denoted:

$d_{n,1}, d_{n,2}, d_{n+1,1}, d_{n+1,2}$

For user 2, we denote:

$p_{n,1,user2}(t)$ $0 \leq t < T/2$ to modulate the first half of the n-th symbol $p_{n,2,user2}(t)$ $0 \leq t < T/2$ to modulate the second half of the n-th symbol The support of $p_{n,1,user2}$ and of $p_{n,2,user2}$ is $[0, T/2]$ The signal received by the mobile may therefore be written:

$$y(t) = ((h_1 s_n - h_2 s_{n+1}^*) * p_{n,user1})(t-nT) + ((h_1 d_{n,1} - h_2 d_{n,2}^*)) * p_{n,1,user2})(t-nT) + b(t) \quad nT \leq t < nT + T/2$$

$$y(t) = ((h_1 s_n - h_2 s_{n+1}^*) * p_{n,user1})(t-nT) + ((h_1 d_{n,2} + h_2 d_{n,1}^*)) * p_{n,2,user2})(t-T/2-nT) + b(t) \quad nT + T/2 \leq t < (n+1)T$$

$$y(t) = ((h_1 s_{n+1} + h_2 s_n^*) * p_{n+1,user1})(t-(n+1)T) + ((h_1 d_{n+1,1} - h_2 d_{n+1,2}^*)) * p_{n+1,1,user2})(t-(n+1)T) + b(t) \quad (n+1)T \leq t < (n+1)T + T/2$$

$$y(t) = ((h_1 s_{n+1} + h_2 s_n^*) * p_{n+1,user1})(t-(n+1)T) + ((h_1 d_{n+1,2} + h_2 d_{n+1,1}^*) * p_{n+1,2,user2})(t-(n+1)T-T/2) + b(t) \quad (n+1)T + T/2 \leq t < (n+2)T$$

In the Fourier domain, the transform of $p_{n,1\ user2}(t)$ over $[0, T]$ will be denoted $C_{n,1,\ user2}(f)$, that of $p_{n,2\ user2}(t)$ $C_{n,2,\ user2}(f)$ which gives $$Y_n(f) = (H_1(f) s_n - s_{n+1}^* H_2(f)) C_{n,user1}(f) + H_1(f)(d_{n,1} C_{n,1,user2}(f) + d_{n,2} C_{n,2,user2}(f)) - H_2(f)(d_{n,2}^* C_{n,1,user2}(f) - d_{n,1}^* C_{n,2,user2}(f))$$

$$Y_{n+1}(f) = (H_1(f) s_{n+1} + s_n^* H_2(f)) C_{n+1,user1}(f) + H_1(f)(d_{n+1,1} C_{n+1,1,user2}(f) + d_{n+1,2} C_{n+1,2,user2}(f)) - H_2(f)(d_{n+1,2}^* C_{n+1,1,user2}(f) - d_{n+1,1}^* C_{n+1,2,user2}(f))$$

So that (15 bis) becomes:

$$s_n \int_B (|H_1(f) C_{n,user1}(f)|^2 + |H_2(f) C_{n+1,user1}(f)|^2) df + \int_B (|H_1(f)|^2 (d_{n,1} C_{n,1,user2}(f) + d_{n,2} C_{n,2,user2}(f)) C_{n,user1}(f)^* - |H_2(f)|^2 (d_{n+1,2} C_{n+1,1,user2}(f)^* - d_{n+1,1} C_{n+1,2,user2}(f)^*) C_{n+1,user1}(f)) df + s_{n+1}^* \int_B H_1(f)^* H_2(f) (|C_{n+1,user1}(f)|^2 - |C_{n,user1}(f)|^2) df - \int_B H_1(f)^* H_2(f) (d_{n,2} C_{n,1,user2}(f) - d_{n,1}^* C_{n,2,user2}(f)) C_{n,user1}(f)^* - (d_{n+1,1}^* C_{n+1,1,user2}(f)^* + d_{n+1,2} C_{n+1,2,user2}(f)^*) C_{n+1,user1}(f)) df = s_n \int_B (|H_1(f) C_{n,user1}(f)|^2 + |H_2(f) C_{n,1,user2}(f) C_{n,user1}(f)^* df + d_{n,1} \int_B |H_2(f)|^2 C_{n,1,user2}(f)) C_{n,user1}(f)^* df - d_{n+1,2} \int_B |H_2(f)|^2 C_{n+1,1,user2}(f)^* C_{n+1,user1}(f) df + d_{n,2} \int_B |H_1(f)|^2 C_{n,2,user2}(f) C_{n,user1}(f)^* df - d_{n+1,1} \int_B |H_2(f)|^2 C_{n+1,2,user2}(f)^* C_{n+1,user1}(f) df + s_{n+1}^* \int_B H_1(f)^* H_2(f) (|C_{n+1,user1}(f)|^2 - |C_{n,user1}(f)|^2) df + d_{n+1,2}^* \int_B H_1(f)^* H_2(f) C_{n+1,2,user2}(f) C_{n,user1}(f)^* - d_{n,2}^* \int_B H_1(f)^* H_2(f) C_{n,1,user2}(f) C_{n,user1}(f)^* df + d_{n,1}^* \int_B H_1(f) H_2(f) C_{n,2,user2}(f) C_{n,user1}(f)^* df$$

The noise terms are seen to appear.

These noise terms are also eliminated in this case by adopting a time-inverted and conjugate coding for the symbols grouped in pairs.

In this case, it is also necessary to apply STTD not to 2 consecutive symbols, but by grouping the symbols in the following manner: if the spreading factor is for example $F_{max}/2$, the 1st symbol is associated with the 4th and the 2nd with the 3rd. The 3rd and 4th symbols have inverted OVSF codes, thereby making it possible to preserve the orthogonality of the codes, when there is orthogonality, between code terms which are "the right way round" or "the wrong way round".

It is shown below that by reversing the direction of time and by conjugating the 1st code (resp the 2nd) to form the 4th code (resp the 3rd), the interference terms are canceled as previously.

More precisely, the advantage in adopting such symmetry of coding is proven mathematically, for two different spreadings, as follows:

$$y(t) = ((h_1 s_n - h_2 s_{n+1}^*) * p_{n,user1})(t-nT) + ((h_1 d_{n,1} - h_2 d_{n+1,2}^*)) * p_{n,1,user2})(t-nT) + b(t) \quad nT \leq t < nT + T/2$$

$$y(t) = ((h_1 s_n - h_2 s_{n+1}^*) * p_{n,user1})(t-nT) + ((h_1 d_{n,2} - h_2 d_{n+1,1}^*)) * p_{n,2,user2})(t-T/2-nT) + b(t) \quad nT + T/2 \leq t < (n+1)T$$

$$y(t) = ((h_1 s_{n+1} + h_2 s_n^*) * p_{n+1,user1})(t-(n+1)T) + ((h_1 d_{n+1,1} + h_2 d_{n,2}^*)) * p_{n+1,1,user2})(t-(n+1)T) + b(t) \quad (n+1)T \leq t < (n+1)T + T/2$$

$$y(t) = ((h_1 s_{n+1} + h_2 s_n^*) * p_{n+1,user1})(t-(n+1)T) + ((h_1 d_{n+1,2} + h_2 d_{n,1}^*) * p_{n+1,2,user2})(t-(n+1)T-T/2) + b(t) \quad (n+1)T + T/2 \leq t < (n+2)T$$

which in the Fourier domain gives:

$$Y_n(f) = (H_1(f) s_n - s_{n+1}^* H_2(f)) C_{n,user1}(f) + H_1(f)(d_{n,1} C_{n,1,user2}(f) + d_{n,2} C_{n,2,user2}(f)) - H_2(f)(d_{n+1,2}^* C_{n,1,user2}(f) + d_{n+1,1}^* C_{n,2,user2}(f))$$

$$Y_{n+1}(f) = (H_1(f) s_{n+1} + s_n^* H_2(f)) C_{n+1,user1}(f) + H_1(f)(d_{n+1,1} C_{n+1,1,user2}(f) + d_{n+1,2} C_{n+1,2,user2}(f)) + H_2(f)(d_{n,2}^* C_{n+1,1,user2}(f) + d_{n,1}^* C_{n+1,2,user2}(f))$$

so that (15bis) becomes:

$$s_n \int_B (|H_1(f) C_{n,user1}(f)|^2 + |H_2(f) C_{n+1,user1}(f)|^2) df +$$

$$\int_B (|H_1(f)|^2 (d_{n,1} C_{n,1,user2}(f) + d_{n,2} C_{n,2,user2}(f)) C_{n,user1}(f)^* + |H_2(f)|^2 (d_{n,2} C_{n+1,1,user2}(f)^* + d_{n,1} C_{n+1,2,user2}(f)^*) C_{n+1,user1}(f)) df +$$

$$s_{n+1}^* \int_B H_1(f) H_2(f) (|C_{n+1,user1}(f)|^2 - |C_{n,user1}(f)|^2) df - \int_B H_1(f)^* H_2(f) (d_{n+1,2}^* C_{n,1,user2}(f) + d_{n+1,1}^* C_{n,2,user2}(f)) C_{n,user1}(f) - (d_{n+1,1}^* C_{n+1,1,user2}(f)^* + d_{n+1,2}^* C_{n+1,2,user2}(f)^*) C_{n+1,user1}(f)) df$$

$$= s_n \int_B (|H_1(f) C_{n,user1}(f)|^2 + |H_2(f) C_{n+1,user1}(f)|^2) df +$$

$$d_{n,1} \int_B (|H_1(f)|^2 C_{n,1,user2}(f) C_{n,user1}(f)^* + |H_2(f)|^2 C_{n+1,2,user2}(f)^* C_{n+1,user1}(f)) df +$$

$$d_{n,2} \int_B (|H_1(f)|^2 C_{n,2,user2}(f)) C_{n,user1}(f)^* + |H_2(f)|^2 C_{n+1,1,user2}(f)^* C_{n+1,user1}(f)) df +$$

$$s_{n+1}^* \int_B H_1(f)^* H_2(f) (|C_{n+1,user1}(f)|^2 - C_{n,user1}(f)|^2) df$$

$$-d_{n+1,1}^* \int_B H_1(f)^* H_2(f) (C_{n,2,user2}(f)) C_{n,user1}(f)^* - C_{n+1,1,user2}(f)^* C_{n+1,user1}(f)) df$$

$$-d_{n+1,2}^* \int_B H_1(f)^* H_2(f) (C_{n,1,user2}(f) C_{n,user1}(f)^* - C_{n+1,2,user2}(f)^* C_{n+1,user1}(f)) df$$

It is seen that the last 3 terms vanish if $p_{n+1,user1}(t) = p_{n,user1}(T-t)^*$ and if $p_{n+1,1,user2}(t) = p_{n,2,user2}(T-t)^*$ and $p_{n+1,2,user2}(t) = p_{n,1,user2}(T-t)^*$ More generally, the STTD grouped pairs or p-tuples are preferentially arranged in arrangements by subgroups, where two subgroups are placed symmetrically, with reference to the temporal center of a sequence of two longest symbols.

More generally, in the case of n antennas and of p-tuples to be transmitted, the n-tuples transmitted at k different instants are grouped in pairs, this being possible since k is even, so that each pair exhibits a symmetry of coding with respect to the temporal center of the two longest associated symbols.

In the case of UMTS, where the interference is required to be as weak as possible also in the case where the channels are constants with respect to frequency, it is noted that with the arrangements suggested above, a third interference is also eliminated in this case.

The waveform which modulates the symbol transmitted by user i at symbol time n is denoted below by:

$$p_{n,useri}(t)=\Sigma_{k=1,F}C_{useri,k,n}p_{chip}(t-kT_{chip}) 0 \leq t \leq T$$

$\{C_{useri,k,n}\}$ k=1, F is a code. The values of the coefficients belong in general to a complex finite alphabet. We write $C_{n,useri}(t)=\Sigma_{k=1,F}C_{useri,k,n}\delta(t-kT_{chip})$.

In a preferential embodiment, the codes transmitted by 2 users i and j at the same instant n and with the same spreading factor F are orthogonal:

$$\Sigma_{k=1,F}C_{useri,k,n}C_{userj,k,n}*=0,$$

Orthogonality is in particular a requirement for UMTS.

In conventional systems with orthogonality, the codes were constructed in such a way as to comply with orthogonality even if the spreading factors are different. For example, consider two users, one i with spreading factor F, the other j with spreading factor F/2.

We have $\Sigma_{k=1,F/2}C_{useri,k,n}C_{userj,k,n}=0,$ $$\Sigma_{k=F/2+1,F}C_{useri,k,n}C_{userj,k-F/2+1,n+1}*=0,$$

These codes are for example so-called OVSF (Orthogonal Variable Spreading Factor) [4] in the case of UMTS.

In the example of an OVSF code, we are interested here in the downlink: each symbol transmitted is firstly spread by a string of chips forming an OVSF code of length equal to the spreading factor. The OVSF code and the spreading factor are characteristic of a given user: $C_{useri,k,n}$ does not depend on n.

The OVSF codes of the same length are mutually orthogonal. When different users of spreading factor F' and F are multiplexed, the OVSF codes associated with them are chosen in such a way as to comply with the following property: if $F'/F=2^g$, then, the code of length F' is composed of $2^g$ sequences of length F end-to-end. In the prior art, each of these sequences F is orthogonal to the OVSF code of length F placed at the same position.

To maintain orthogonality between codes of different spreading factors (hierarchical orthogonality), a series of arrangements preferentially adopted together is proposed hereinbelow.

In the case of a system where the spreading factors exhibit a ratio $2^g$ each time, one considers the maximum size of a symbol (smallest bit rate), for example the size of 128 chips. The pairs of symbols, in a signal with the smallest bit rate, thus have a size of 256 chips.

For two pairs of samples of 128 chips each transmitted simultaneously and with orthogonal codes, the first sample is coded with a given code, and the second with the conjugate and time-inverted code, this being done on both antennas.

Thus, over the first symbol the codes remain mutually orthogonal since they are not modified, and are likewise orthogonal for the second sample since they are inverted and conjugated in the same manner.

Figure 3:
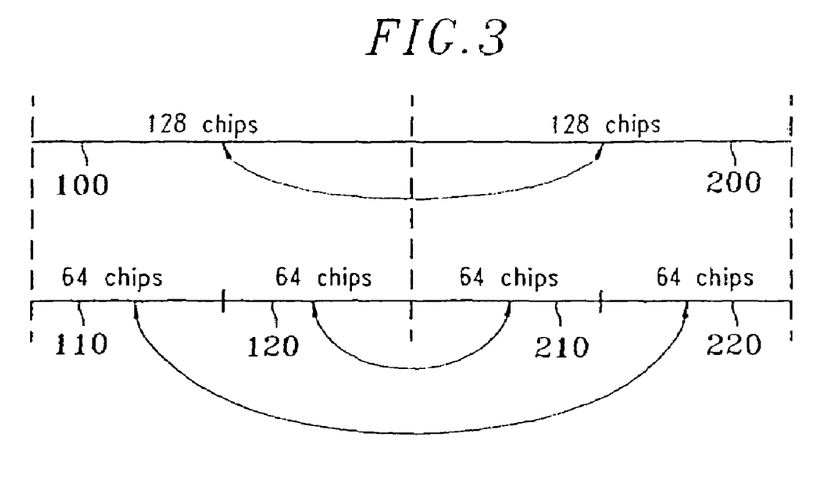
FIG. 3 represents a preferential arrangement of coding with reference to a transmission interval for a symbol of maximum length, according to the invention.

One wishes to maintain orthogonality between different spreadings, for example between a pair of symbols 100 and 200 (FIG. 3) each of length 128 chips and a series of four symbols 110, 120, 210, 220 each of length 64 chips (FIG. 3). Let us assume that a code is available over the first symbol 110 of 64 chips which is orthogonal to the code part applied over the first 64 chips of the simultaneous long symbol 100 (128 chips).

If the second symbol of 64 chips has the same code as the first but conjugated and inverted with respect to time, it is not necessarily orthogonal to the corresponding 64-chip sequence applied in second position over the long symbol 100, since the corresponding code in this symbol 100 is not inverted.

Hence, in the case of hierarchical orthogonality, a same arrangement of the codes as that suggested hereinabove for the general case of different spreading codings is proposed. The 64-bit inverted and conjugated code is placed, as is the symbol to which it is applied, that is to say the symbol grouped first by STTD, in a position placed in correspondence with a part of the second 128-chip sample 200, so that two signals with conjugate and inverse codes correspond and therefore preserve the initial hierarchical orthogonality relation.

More precisely, a short conjugate inverse code 220 is placed facing the zone of the second long sample 200, which zone is the temporal inverse of the sequence corresponding temporally to the initial uninverted 64-bit code 110.

The systematic hierarchical orthogonality relation is thus preserved.

Moreover, in a typical cellular telephony system, a very long (much longer than the spreading factor) sequence of so-called scrambling chips 400 (FIG. 4) is allocated to each cell. This sequence multiplies chip by chip the symbols 110, 120, 210, 220 previously spread by an OVSF code 300. It is complex with modulus 1. It is denoted embr. Each coded symbol 100, 200, 110, 120; 210, 220 is multiplied by a portion of length F or F' of embr. Multiplication by this sequence does not affect the orthogonality of the codes, hence $\int_{[O,T]} p_{n,userj}(t)p_{n,userj}*(t)dt=0.$ In a system with hierarchical orthogonality such as that proposed above, certain suggestions given hereinbelow, that make it possible to preserve the advantages of the reduction of interference, are preferentially adopted.

Figure 4:
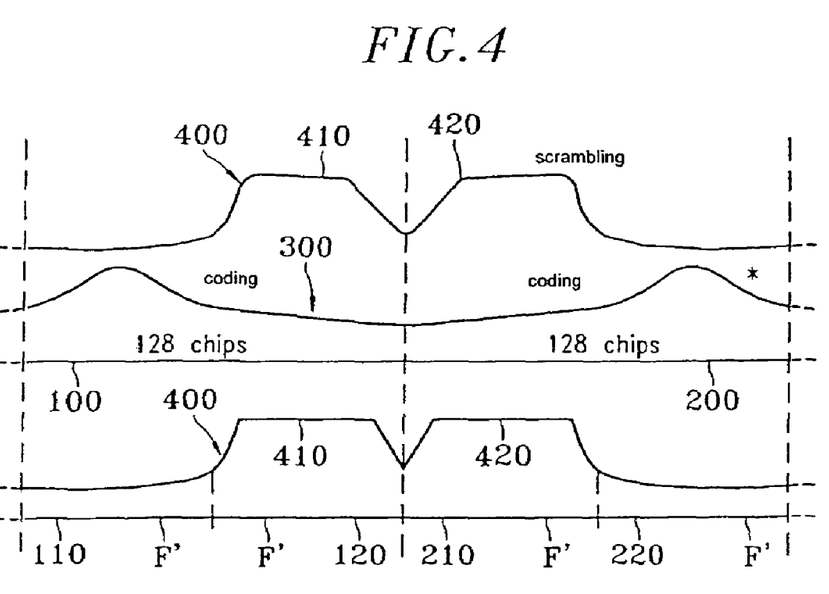
FIG. 4 represents a preferential arrangement of scrambling coding, according to the invention.

Thus, the scrambling sequence 400 preferentially exhibits the form of pairs of sequences 410, 420, each sequence having the maximum symbol length, 128 chips here, and each pair exhibits a temporal symmetry between the two sequences 410 and 420 of the pair. The sequences 410 and 420 of the pair are also mutually conjugate. The conjugate pairs with symmetry are concomitant with the pairs of long symbols 100, 200.

Thus, in the manner described above, the symbols grouped by STTD are associated according to symmetric subgroups around points separating the pairs of sequences of 128 chips, and the same is done in respect of the scrambling which itself satisfies the character of temporal inversion and conjugation between the STTD associated pairs.

The scrambling likewise satisfying this symmetry, the STTD grouped symbols are properly coded, even when considering the scrambling, by a general coding which reduces interference. Moreover, the inter-spreading orthogonality is preserved.

Thus, the scrambling sequence 410 is, likewise, modified, so as to repeat in the reverse direction, and conjugated in each second maximum length STTD symbol: $embr_{n+1}$, $k=embr_n$, $F-k+1*$ or F is the maximum symbol duration.

For each spreading symbol less than F', a scrambling part is applied to this symbol, this part being applied simultaneously to a symbol of maximum length 100, 200. The short symbols being placed according to a symmetry with respect to the same reference instants as the scrambling, the elimination of interference is also preserved for the short symbols, as is the orthogonality.

A scrambling portion, time-inverted or otherwise, and conjugated or otherwise, is therefore applied in practice to a short symbol, depending on whether the symbol is concomitant with a first long symbol 410 or with a second long symbols 420.

Of course, when passing from a pair of long symbols 410, 420 to the next pair, the scrambling is preferentially different, although still satisfying a symmetry, and conjugated with respect to the center of the pair.

Thus, in the case of STTD grouping in groups of 2, that is to say typically with two antennas, by considering the maximum spreading factor $F_{max}$ (256 for UMTS), the principle described consists in reversing the direction of time (and in conjugating) the scrambling of length 256 at the rate of one out of 2 by reversing these codes at the level of the centers of STTD associated long pairs. This procedure is easily generalized to the case of grouping by p-tuples where p is different from 2.

In the case of UMTS, the scrambling sequence is modified in such a way that it repeats, inverting itself and conjugating itself every $F_{max}$ chips.

Figure 5:
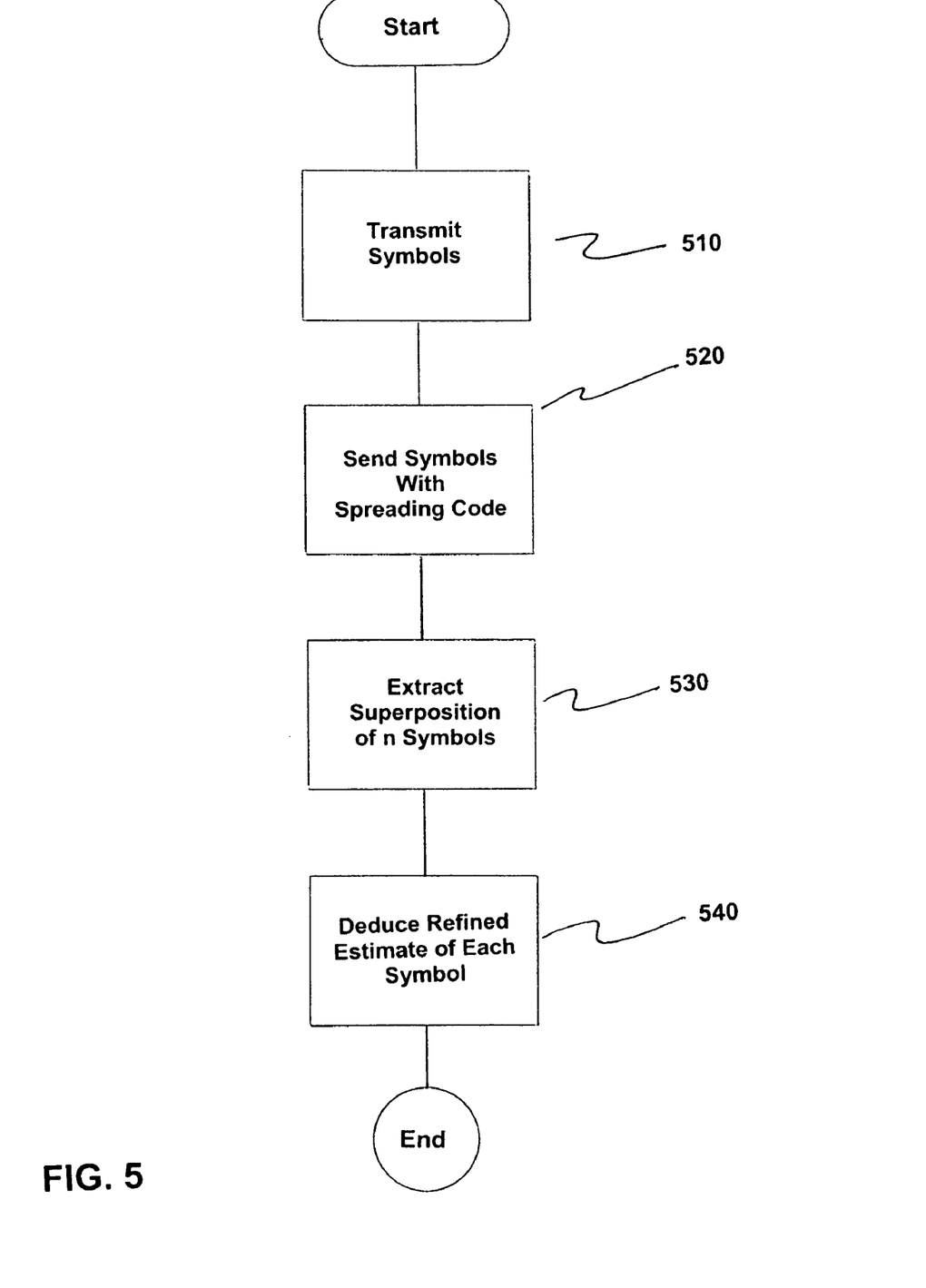
FIG. 5 is a flow chart representing the steps of the method of the invention.

FIG. 5 is a flow chart representing the steps of the method of the invention. A number n of antennas are used to transmit symbols which are grouped into p-tuples $(S_1, \ldots S_n)$, while simultaneously sending, for each p-tuple, k times n symbols, as indicated in step 510. Here, n is greater than or equal to 2, the n symbols consist each time of values from among the p-tuples $S_1, \ldots, S_p$ which are in a modified order and are assigned weights chosen selectively from among −1, 0 and 1, and are selectively conjugated, so that k linear superpositions of n symbols are transmitted as a transmission matrix of dimensions k×p which is substantially orthogonal.

Each symbol is sent with a spread spectrum coding from the n antennas, as indicated in step 520. Here, the spread spectrum codes are the same on the n antennas at each transmission concerned among the k transmissions and the transmission is performed over a physical or contrived channel which constitutes substantially a sum of Diracs, so that each superposition of symbols is repeated a plurality of times on reception.

Each superposition of n symbols is then extracted, as indicated in step 530. The extraction is aided by a plurality of despreadings on each reception, and a plurality of extractions are aided by a plurality of despreadings for each of the k linear superpositions transmitted to obtain a plurality of estimations of k-tuples. In addition, each k-tuple forms a result of the k×p transmission matrix and the orthogonality of the k×p transmission matrix is utilized a plurality of times corresponding to each of the plural k-tuple extractions that is aided by each of the plural despreadings to thereby obtain a plurality of estimations of the p-tuples $(S_1, \ldots S_p)$.

A refined estimation of each symbol is deduced based on the plural estimations of the p-tuples; $(S_1, \ldots, S_p)$, as indicated in step 540. In accordance with the disclosed method k is an even number, and the symbols are coded according to k successive spread spectrum codes corresponding to the k transmissions, where the k codes comprise k/2 pairs of spread spectrum codes which satisfy, in each pair, the relationship in which the spread spectrum code of the pair is time-inverted and conjugated with respect to the other spread spectrum code of the pair, and possibly multiplied by a complex constant of modulus 1.

REFERENCES

[1] PROAKIS Digital Communications Mc Graw-Hill
[2] N. SESHADRI, J. H. WINTERS "Two schemes for improving the performance of frequency-division duplex (FDD) transmission systems using transmitter antenna diversity" Int. J. Wireless Inform. Networks, vol. 1, no 1, pp. 49-60 January 1994
[3] S. M. ALAMOUTI "A simple Transmit Diversity Technique for Wireless Communications" IEEE Journal on Selected Areas in Communications October 1998 Vol 16 no 8 pp. 1451-1458
[4] 3GPP 3G TS 25.211 V3.2.0 (Draft 1) March 2000 3G TS 25.213 V3.2.0 (Draft 1) March 2000
[5] P. BALABAN, J. SALZ "Dual diversity Combining and Equalization in Digital Cellular Mobile Radio" IEEE Trans on Vehicular Technology Vol 40 no 2 May 1991

The invention claimed is:

1. A transmission method, comprising:
transmitting, from n antennas, symbols which are grouped into p-tuples, while simultaneously sending, for each p-tuple, k times n symbols, said n being greater than or equal to 2, the n symbols each comprising values from among said p-tuples which are in a modified order and are assigned weights chosen selectively from among −1, 0 and 1, and are selectively conjugated, so that k linear superpositions of n symbols are transmitted as a transmission matrix of dimensions k×p which is substantially orthogonal;
sending, from the n antennas, each symbol with a spread spectrum coding, the spread spectrum coding being the same on the n antennas at each transmission concerned among the k transmissions, the transmission being performed over a physical or contrived channel which constitutes substantially a sum of Diracs, so that each superposition of symbols is repeated a plurality of times on reception;
extracting each superposition of n symbols, said extraction being aided by a plurality of despreadings on each of said plural reception, and a plurality of extractions being aided by a plurality of despreadings for each of the k linear superpositions transmitted to obtain a plurality of estimations of k-tuples, each k-tuple forming a result of the k×p transmission matrix, an orthogonality of the k×p transmission matrix being utilized a plurality of times corresponding to each said plural k-tuple extractions aided by each of said plural despreadings to obtain a plurality of estimations of the p-tuples; and
deducing a refined estimation of each symbol based on the plural estimations of the p-tuples;
wherein k is an even number; and
wherein the symbols are coded according to k successive spread spectrum codes corresponding to the k transmissions, the k codes comprising k/2 pairs of spread spectrum codes which satisfy, in each pair, a relationship in which the spread spectrum code of the pair is time-inverted and conjugated with respect to the other spread spectrum code of the pair.

2. The method as claimed in claim 1, wherein the number of transmissions k per p-tuple is greater than or equal to the number n of antennas.

3. The method as claimed in claim 2, wherein the k transmissions are performed over k time intervals each having a duration F, said k time intervals being symmetrically distributed in pairs with respect to a center of an interval having a length $2^m F$, the spread spectrum codes applied to two symbols placed symmetrically with respect to a center of an interval having the length of $2^m F$ being time-inverted and conjugated.

4. The method as claimed in claim 1 wherein the k transmissions are performed over k time intervals each having a duration F, said k time intervals being symmetrically distributed in pairs with respect to a center of an interval having a length $2^m F$, the spread spectrum codes applied to two symbols placed symmetrically with respect to the center of the interval of length $2^m F$ being time-inverted and conjugated.

5. The method as claimed in claim 1, wherein during k/2 given transmissions, symbols are transmitted which are conjugated with respect to the symbols sent in the other k/2 transmissions, and wherein the spread spectrum codes applied to the k/2 other transmissions are temporal inverses and conjugates of the spread spectrum codes applied to the k/2 given transmissions.

6. The method as claimed in claim 1, wherein a plurality of superimposed signals are transmitted on the antennas with a given symbol length, and a general spread spectrum code having a length at least equal to the given symbol length is superposed on an orthogonal spreading factor applied to a plurality of said symbols, and wherein the general spread spectrum code comprises a series of pairs of successive subcodes, each pair of successive subcodes having a length equal to that of the given symbol length, and two subcodes of each pair of successive subcodes being time-inverted and conjugated with respect to one another.

7. The method as claimed in claim 1, wherein a plurality of superimposed signals are transmitted on the antennas with different symbol lengths each expressed in accordance with the relationship $2^q F_0$, where $F_0$ comprises a smallest symbol length, and a general spread spectrum code having a length at least equal to $2^{q_{max}} F_0$ is superposed on an orthogonal spreading factor applied to the plurality of symbols, where $2^{q_{max}} F_0$ comprises a maximum symbol length, and wherein the general spread spectrum code comprises a series of pairs of successive subcodes, each pair of successive subcodes having a symbol length $2^{q_{max}} \times F_0$ and two subcodes of each pair of successive subcodes being time-inverted and conjugated with respect to one another.

8. The method as claimed in claim 1, wherein the antennas are n=2 in number, the symbols are transmitted in groups of p=2 for a number of transmissions of k=2 to obtain a 2×2 dimensioned transmission matrix.

9. The method as claimed in claim 8, wherein a plurality of signals having different symbol lengths equal to $2^q F_0$, where $F_0$ comprises a smallest symbol length, are transmitted simultaneously, and wherein grouped symbol pairs are placed with reference to symbol pairs of maximum length $2^{q_{max}}$ by placing two symbols of each pair in a symmetric manner with respect to a temporal center of a concomitant pair of symbols having the maximum length $2^{q_{max}}$.

10. The method of claim 1, wherein the spread spectrum code of the pair is multiplied by a complex constant of modulus 1.

* * * * *